United States Patent
Campbell et al.

(10) Patent No.: US 8,090,251 B2
(45) Date of Patent: *Jan. 3, 2012

(54) FRAME LINKED 2D/3D CAMERA SYSTEM

(75) Inventors: Patrick Campbell, Stevenson Ranch, CA (US); Vincent Pace, Shadow Hills, CA (US)

(73) Assignees: James Cameron, Burbank, CA (US); Vincent Pace, Burbank, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/752,311

(22) Filed: Apr. 1, 2010

(65) Prior Publication Data
US 2011/0085789 A1    Apr. 14, 2011

Related U.S. Application Data

(63) Continuation-in-part of application No. 12/578,171, filed on Oct. 13, 2009, now Pat. No. 7,929,852.

(51) Int. Cl.
G03B 3/00 (2006.01)

(52) U.S. Cl. ........................................................ 396/89

(58) Field of Classification Search ............... 396/89
See application file for complete search history.

(56) References Cited

U.S. PATENT DOCUMENTS

| | | | |
|---|---|---|---|
| 4,155,100 A | 5/1979 | Hill, Jr. | |
| 4,811,093 A | 3/1989 | Giacometti | |
| 5,465,128 A * | 11/1995 | Wah Lo et al. | 396/326 |
| 5,699,108 A * | 12/1997 | Katayama et al. | 348/47 |
| 5,737,655 A * | 4/1998 | Inaba | 396/324 |
| 5,801,760 A * | 9/1998 | Uomori | 348/47 |
| 5,974,272 A * | 10/1999 | Kiesow et al. | 396/140 |
| 5,978,015 A * | 11/1999 | Ishibashi et al. | 348/47 |
| 6,160,607 A * | 12/2000 | Diaconu | 352/140 |
| 6,326,994 B1 | 12/2001 | Yoshimatsu | |
| 6,388,666 B1 | 5/2002 | Murray | |
| 6,512,892 B1 * | 1/2003 | Montgomery et al. | 396/326 |
| 6,701,081 B1 * | 3/2004 | Dwyer et al. | 396/329 |
| 6,909,457 B1 | 6/2005 | Fukasawa | |
| 7,031,512 B2 | 4/2006 | Ng | |
| 7,193,645 B1 | 3/2007 | Aagaard | |
| 7,218,342 B2 | 5/2007 | Kobayashi et al. | |
| 7,527,439 B1 | 5/2009 | Dumm | |
| 7,551,272 B2 * | 6/2009 | Vodanovic | 356/237.1 |
| 2001/0056477 A1 | 12/2001 | McTernan et al. | |

(Continued)

OTHER PUBLICATIONS

World Intellectual Property Organization, International Search Report and Written Opinion for International Application No. PCT/US2010/059321, Mail Date Feb. 11, 2011.

(Continued)

*Primary Examiner* — Rodney Fuller
(74) *Attorney, Agent, or Firm* — SoCal IP Law Group LLP; Steven C. Sereboff; John E. Gunther

(57) ABSTRACT

A method of operating a 3D camera and a frame-linked 2D/3D camera system. The 3D camera may receive data conveying operating parameters of at least one 2D camera. Operating parameters of the 3D camera including a pan angle $\Phi_{3D}$, a tilt angle $T_{3D}$, a lens focal length $FL_{3D}$, and a lens focus distance $FD_{3D}$ may be set based on, at least in part, the received data. An interocular distance IOD of the 3D camera may be set and a stereo convergence angle $\Theta$ of the 3D camera may be set based on IOD and $FD_{3D}$.

39 Claims, 9 Drawing Sheets

U.S. PATENT DOCUMENTS

| | | | |
|---|---|---|---|
| 2002/0012043 A1 | 1/2002 | Guerin et al. | |
| 2007/0103675 A1* | 5/2007 | Vodanovic | 356/237.1 |
| 2007/0247614 A1* | 10/2007 | Puah et al. | 356/73 |
| 2008/0007567 A1 | 1/2008 | Clatworthy et al. | |
| 2008/0123938 A1 | 5/2008 | Kim | |
| 2008/0158345 A1 | 7/2008 | Schklair | |
| 2009/0060273 A1 | 3/2009 | Stephan et al. | |
| 2009/0262184 A1 | 10/2009 | Engle et al. | |

OTHER PUBLICATIONS

Jeong et al., A Study on the Flexible Camera Calibration Method Using a Grid Type Frame with Different Line Widths, Aug. 2-5, 2002, SICE 2002, Proceedings of the 41st SICE Annual Conference, Date Aug. 5-7, 2002, vol. 2, accessed Jan. 28, 2011, http://ieeexplorer.ieee.org/xpl/freeabs_all.jsp?amumber=1195380, pp. 1319-1324.

Chen et al., An Efficient Approach for the Calibration of Multiple PTZ Cameras, Apr. 2007, IEEE transactions on automation science and engineering, vol. 4, No. 2, Apr. 2007, accessed on Jan. 28, 2011, http://ieeexplorer.ieee.org/search/freesearchabstract.jsp?tp=&arnumber=4147544&queryText%3DAn+Efficient+Approach+for+the+Calibration+of+Multiple+PTZ+Cameras%26openedRefinements%3D*%26searchField%3DSearch+All.

Unknown, "21st Century 3D Introduces Uncompressed 4:4:4 Stereoscopic Camera System—3DVX3", SPIE Stereoscopic Displays and Applications Conference; avail. Http://www.21stcentury3d.com/press/pr-060117-3dvx3.html; printed Sep. 11, 2008, 3pp.

Unknown, "21st Century 3D Introduces New Digital Steroscopic Motion Picture Camera System", avail. http://fullcamera.com/article/cfm/id/281457, printed Sep. 11, 2008, 2pp.

Matt Hurwitz, "Dreaming in 3D", CineGear Expo News, The Official CineGear Expo Show Newspaper, Jun. 3-5, 2005, pp. 18-19.

* cited by examiner

FRAME LINKED 2D/3D CAMERA SYSTEM

RELATED APPLICATION INFORMATION

This patent is a continuation-in-part of copending application Ser. No. 12/578,171, filed Oct. 13, 2009, and entitled INTEGRATED 2D/3D CAMERA, now U.S. Pat. No. 7,929,852.

BACKGROUND

1. Field

This disclosure relates to camera systems and specifically to camera systems including a stereographic camera.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
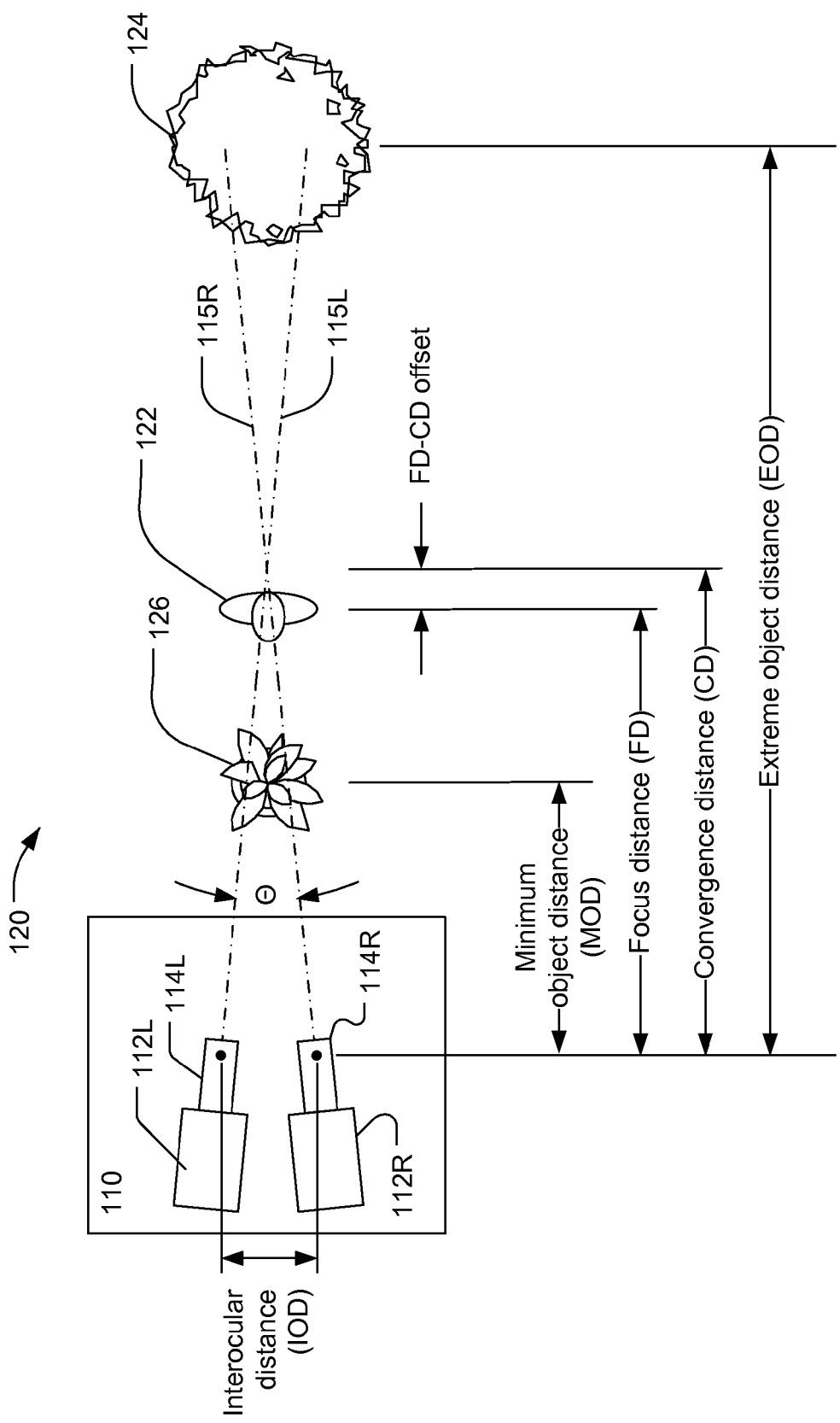
FIG. 1 is a schematic view of a stereographic camera in an environment.

Referring now to FIG. 1, a 3D, or stereographic, camera 110 may include a left camera 112L and a right camera 112R. The term "camera" is intended to include any device having an optical system to form an image of an object and a medium to receive and detect and/or record the image. The left and right cameras 112L, 112R may be film or digital still image cameras, may be film or digital motion picture cameras, or may be video cameras. Each of the left and right cameras 112L, 112R may include a lens 114L, 114R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 112L, 112R.

The left and right cameras 112L, 112R may be separated by an interocular distance IOD. The cameras 112L, 112R may be disposed such that the axis 115L, 115R are parallel or such that a stereo convergence angle Θ is formed between the two axis 115L, 115R. The cameras 112L, 112R may be disposed such that the axis 115L, 115R cross at a stereo convergence distance CD from the cameras. The interocular distance IOD, the stereo convergence distance CD, and the stereo convergence angle Θ are related by the formulas $$\Theta = 2\tan^{-1}\left(\frac{IOD}{2CD}\right), \text{ or} \quad (1)$$

$$CD = \frac{IOD}{2\tan\left(\frac{\Theta}{2}\right)} \quad (2)$$

The interocular distance IOD and the stereo convergence distance CD may be measured from a nodal point within the lenses 114L, 114R. The nodal points may be, for example, the centers of the entrance pupils of the respective lens 114L, 114R.

The stereographic camera 110 may be used to form a stereographic image of a scene 120. As shown in the simplified example of FIG. 1, the scene 120 may include a primary subject 122, which is shown, for example, as a person. The scene 120 may include other features and objects in the background (behind the primary subject 122), such as the tree 124. The scene 120 may also include other features and objects in the foreground (between the camera and the primary subject 122), such as the plant 126. A distance from the stereographic camera 110 to the furthest background object may be defined as the extreme object distance EOD. A distance from the stereographic camera 110 to the closest foreground object may be defined as the minimum object distance MOD.

When the images from a stereographic camera, such as the stereographic camera 110, are displayed on a viewing screen, scene objects at the convergence distance CD will appear to be in the plane of the viewing screen. Scene objects, such as the primary subject 122 in the example of FIG. 1, located closer to the stereographic camera than the convergence distance CD may appear to be in front of the viewing screen. Scene objects, such as the tree 116, located further from the stereographic camera than the convergence distance CD may appear to be behind the viewing screen.

Each lens 114L, 114R may have adjustable focus. The lenses 114L, 114R may be focused at a common adjustable focus distance FD. The focus distance FD may be adjusted manually or may be automatically adjusted. The focus distance FD may be adjusted such that the cameras 112L, 112R are focused on the primary subject 122. The focus distance FD may be automatically adjusted in response to a sensor (not shown) that determines the distance from the cameras 112L, 112R to the primary subject 122. The sensor to determine the distance from the cameras to the primary subject 122 may be an acoustic range finder, an optical or laser range finder, or some other distance-measuring device. In the case where the cameras 112L, 112R are digital still image, motion picture, or video cameras, the focus distance FD may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 112L, 112R to the primary subject 122. However, as shown in FIG. 1, the convergence distance CD and the focus distance FD may not be the same distance. For example, the focus distance FD may be set at the distance from the cameras to the primary subject 122 and the convergence distance CD may be set slightly longer than the focus distance. In this case, when the images are displayed, the primary subject 122 will be seen to be in front of the plane of the viewing screen.

Each lens 114L, 114R may also have zoom capability, which is to say that the focal length FL of each lens may be adjusted. The focal lengths $FL_L$, $FL_R$ of the lenses 114L, 114R may be adjusted manually or automatically. The focal lengths $FL_L$, $FL_R$ of the lenses 114L, 114R may be adjusted synchronously such that focal lengths $FL_L$, $FL_R$ of the lenses are precisely the same at all times. The focal lengths $FL_L$, $FL_R$ of the lenses 114L, 114R may be adjustable over a predetermined continuous range of focal lengths.

Figure 2:
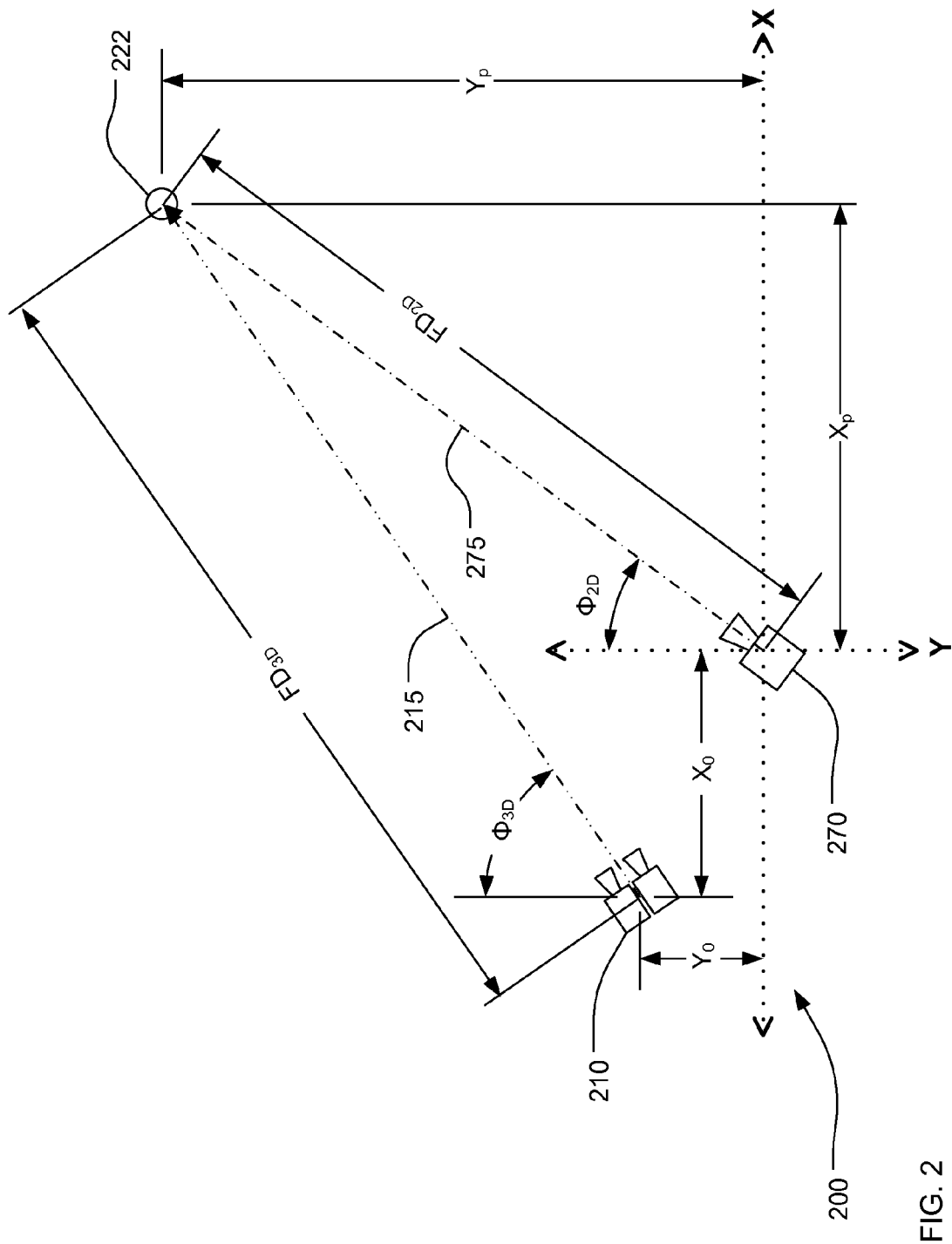
FIG. 2 is a schematic top view of frame-linked 2D and 3D cameras in an environment.

Referring now to FIG. 2, a frame linked 2D/3D camera system 200 may include a 2D camera 270 and a physically separate stereographic or 3D camera 210. The 2D camera 270 and the 3D camera 210 may be separated by a distance $X_0$ along an X axis, and by a distance $Y_0$ along a Y axis orthogonal to the X axis. The 2D camera 270 and the 3D camera 210 may also be physically separated by a distance $Z_0$ (not visible in FIG. 2) along a Z axis normal to the plane of FIG. 2. The 2D camera 270 and the 3D camera 210 may be coupled in a master-slave relationship such that one camera is automatically operated such that both cameras point at and focus upon the same primary scene object. In the subsequent discussion, an assumption is made that the 2D camera 270 is the master camera controlled by an operator and the 3D camera 210 is the slave.

The 2D camera 270 may be oriented such that an optical axis 275 of the 2D camera is directed at a primary scene object 222. The focus distance $FD_{2D}$ of a lens within the 2D camera 270 may be set equal to the distance from the 2D camera 270 to the primary scene object 222. The orientation of the 2D camera 270 may be defined by a pan angle $\Phi_{2D}$, which is defined in this example as the angle between the optical axis 275 of the 2D camera 270 and the Y axis, and by a tilt angle $T_{2D}$ (not visible in FIG. 2) which is defined as the angle between the optical axis 275 and the plane of FIG. 2.

The location of the primary scene object 222 with respect to the 2D camera 270 may be determined from the pan angle $\Phi_{2D}$, the tilt angle $T_{2D}$, and the focus distance $FD_{2D}$. Specifically, defining the location of the 2D camera 270 to be the origin of a rectangular coordinate system, the position of the primary scene object 222 may be defined by $X_p$, $Y_p$, and $Z_p$ coordinates (where Z is normal to the plane of FIG. 2 and thus not visible in FIG. 2), where:

$$X_p = FD_{2D}\cos(T_{2D})\sin(\Phi_{2D}); \quad (3)$$

$$Y_p = FD_{2D}\cos(T_{2D})\cos(\Phi_{2D}); \text{ and} \quad (4)$$

$$Z_p = FD_{2D}\sin(T_{2D}). \quad (5)$$

The required pan angle $\Phi_{3D}$, the tilt angle $T_{3D}$, and the focus distance $FD_{3D}$ may then be determined based on the coordinates $X_p$, $Y_p$, $Z_p$ of the primary scene object and the known position $X_0$, $Y_0$, $Z_0$ of the 3D camera 210 relative to the 2D camera 270. Specifically, formulas (6), (7), and (8) define the required pan angle $\Phi_{3D}$, tilt angle $T_{3D}$, and focus distance $FD_{3D}$ such that the center of the image frame captured by the 3D camera 210 will be coincident with the center of the image frame captured by the 2D camera 270:

$$\Phi_{3D} = \tan^{-1}\left[\frac{X_p - X_0}{Y_p - Y_0}\right] \quad (6)$$

$$T_{3D} = \sin^{-1}\left[\frac{Z_p - Z_0}{FD_{3D}}\right] \quad (7)$$

$$FD_{3D} = \sqrt{(X_p - X_0)^2 + (Y_p - Y_0)^2 + (Z_p - Z_0)^2} \quad (8)$$

When using multiple cameras for photography, it is desirable to "synchronize" the timing of the shutters in all cameras. This synchronization may reduce or eliminate differences between the multiple images due to subject motion allowing for the creation of 2D or 3D imagery from multiscopic image capture. The 3D camera 210 and the 2D camera 270 may include a shutter synchronization device which provides an interface to a master time signal and ensures that all cameras included in a frame-linked 2D/3D camera system capture the scene at precisely the same moment, within a preset allowable tolerance.

The 3D camera 210 and the 2D camera 270 may include zoom lenses, or lenses with adjustable focal length. Adjusting the focal length FL of a camera lens changes the size of the image frame, or field of view, captured by the camera. Setting the size and location of the image frame is commonly referred to as "framing" the image or shot. A focal length $FL_{2D}$ of the lens in the 2D camera 270 may be set by the camera operator to provide a desired framing of a primary scene object. In a frame-linked 2D/3D camera system such as the camera system 200, a desired focal length $FL_{3D}$ for the lenses in a 3D camera may be determined, at least in part, from a focal length $FL_{2D}$ of a 2D camera. The term "frame-linked" means the framing of the 3D camera is linked to, but not necessarily the same as, the framing of the 2D camera.

A camera lens projects an image of the scene being captured onto a film plane or image sensor within the camera. Conversely, the lens may be thought to project an image of the sensor onto the scene. The image of the sensor defines a rectangular area, or frame, in three-dimensional space. Scene objects visible through this "frame" are captured by the camera. Scene objects in the plane of the frame may be sharply focussed onto the image sensor within the camera, and scene objects in front and back of the frame may be less than perfectly focused.

Figure 3:
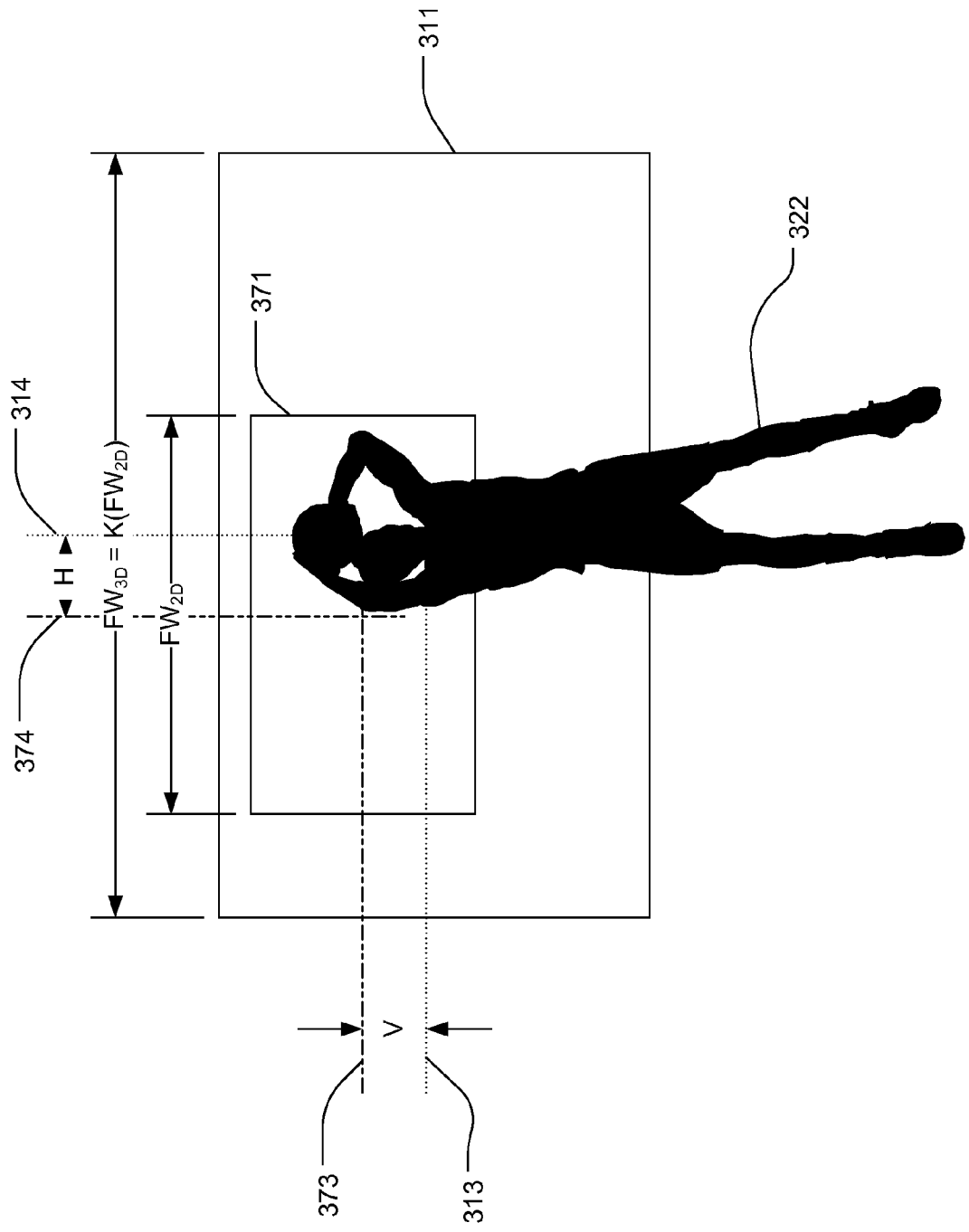
FIG. 3 is a schematic view of image frames of frame-linked 2D and 3D cameras.

As shown in FIG. 3, tight framing (in which a primary scene object 322 fills a large portion of the 2D frame 371) may frequently be used for the 2D camera. However, wider framing for the 3D camera, such as the 3D frame 311, may be appropriate to emphasize the depth captured by the 3D camera. Thus a frame width $FW_{3D}$ captured by the 3D camera may be set to be proportional to, but not necessarily equal to, a frame width $FW_{2D}$ captured by the 2D camera, in accordance with the formula:

$$FW_{3D} = K(FW_{2D}), \quad (9)$$

where K=a proportionality constant (K>0).

The frame width captured by a camera may be approximated by the formula:

$$FW \approx \frac{S(FD)}{FL} \quad (10)$$

where FW=the frame width;
  S=the width of the image sensor within the camera;
  FD=the camera lens focus distance=the distance from the camera to a primary scene object; and
  FL=the camera lens focal length.

Combining (9) and (10), the focal length $FL_{3D}$ of the 3D camera lenses may be determined by:

$$FL_{3D} = \frac{FL_{2d} S_{3D}}{K S_{2D}}, \quad (11)$$

where $FL_{3D}$ and $FL_{2D}$=focal lengths of the 3D and 2D camera lenses, respectively;
  $S_{3D}$ and $S_{2D}$=widths of the image sensors within the 3D and 2D cameras, respectively; and
  K=the proportionality constant (K>0).

In the example shown in FIG. 3, the proportionality constant K is about 2.0. It is common art in image capture to provide a wide view, which may be called a long shot, of a scene along with a closer view, which may be called a mid shot, of the same scene or a mid shot and a medium close-up, for editorial purposes. The frame width proportion between a long shot and a mid shot, and between a mid shot and a medium close-up is generally 2.0:1, so the proportionality constant K may typically be in the range from 1.0 to 2.0, however the selection of the proportionality constant K is not critical to this disclosure beyond the constraint that K must be greater than 0. The proportionality constant K may be predetermined and fixed for recording a scene or event. The proportionality constant K may be controlled in real-time by an operator. The proportionality constant K may be determined from the lens focal length $FL_{2D}$, lens focus distance $FD_{2D}$, and/or the frame width $FW_{2D}$ of the 2D camera, for example using a formula or look-up table.

As also shown in the example of FIG. 3, the 3D frame 311 need not be concentric with the 2D frame 371. In this example, the larger 3D frame 311 is centered lower than and to the right of the 2D frame 371 such that the 3D camera captures more of the primary scene object 322 (as opposed to capturing more empty space above the primary scene object 322). The difference between a vertical centerline 373 of the 2D frame 371 and a vertical centerline 313 of the 3D frame 311 may be expressed as a vertical offset distance V. The difference between a horizontal centerline 374 of the 2D frame 371 and a horizontal centerline 314 of the 3D frame 311 may be expressed as a horizontal offset distance H. The vertical offset distance V may be positive or negative, such that the center of the 3D frame 311 may be higher or lower than the center of the 2D frame 371. The vertical offset distance V may be zero. The magnitude of the vertical offset distance V may be less than half of a height of the 2D frame 371, such that the center of the 3D frame 311 falls within the 2D frame 371. Similarly, the horizontal offset distance H may be positive or negative, such that the center of the 3D frame 311 may be to the left of or to the right of the center of the 2D frame 371. The horizontal offset distance H may be zero. The magnitude of the horizontal offset distance H may be less than half of a width of the 2D frame 371, such that the center of the 3D frame 311 falls within the 2D frame 371.

The vertical offset distance V may be predetermined and fixed for recording a scene or event. The vertical offset distance V may be controlled in real-time by an operator. The vertical offset distance V may be determined based on the lens focus distance FD, and/or the frame height of the 2D camera, for example using a formula or look-up table, from the lens focal length. Given a value of the vertical offset distance V, the required tilt angle $T_{3D}$ of the 3D camera can be determined using the formula:

$$T_{3D} = \sin^{-1}\left[\frac{Z_p - Z_0 - V}{FD_{3D}}\right] \qquad (12)$$

Although not shown in FIG. 3, the vertical offset between the 3D frame 311 and the 2D frame 371 may also be expressed as an angle difference $\Delta T$ between the tilt angle $T_{3D}$ of the 3D camera and the nominal angle calculated by (7). In this case, $$T_{3D} = \sin^{-1}\left[\frac{Z_p - Z_0}{FD_{3D}}\right] + \Delta T \qquad (13)$$

The horizontal offset distance H may be predetermined and fixed for recording a scene or event. The horizontal offset distance H may be controlled in real-time by an operator. The horizontal offset distance H may be determined based on the lens focus distance, and/or the frame width of the 2D camera, for example using a formula or look-up table, from the lens focal length. Given a value of the horizontal offset distance H, the required pan angle $\Phi_{3D}$ of the 3D camera can be determined using the formula:

$$\Phi_{3D} = \tan^{-1}\left[\frac{X_p - X_0}{Y_p - Y_0 - H}\right] \qquad (14)$$

Although not shown in FIG. 3, the horizontal offset between the 3D frame 311 and the 2D frame 371 may also be expressed as an angle difference $\Delta\Phi$ between the pan angle of the 3D camera $\Phi_{3D}$ and the nominal angle calculated by (6). In this case, $$\Phi_{3D} = \tan^{-1}\left[\frac{X_p - X_0}{Y_p - Y_0}\right] + \Delta\Phi \qquad (15)$$

Figure 4:
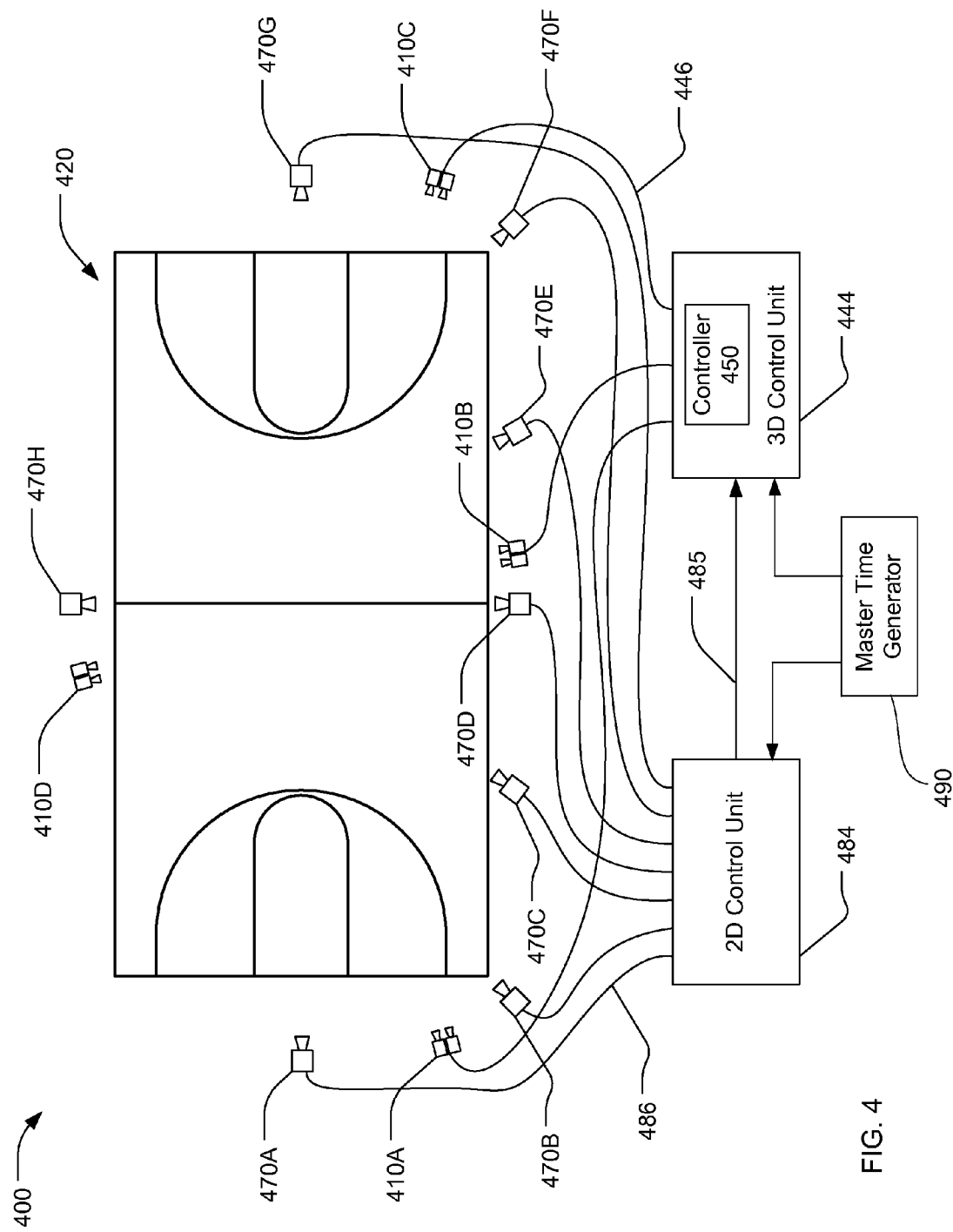
FIG. 4 is a schematic top view of a plurality of 2D and 3D cameras in an environment.

Referring now to FIG. 4, a frame linked 2D/3D camera system 400 may include a plurality of 2D cameras 470A, 470B, 470C, 470D, 470E, 470F, 470G, 470H and a plurality of 3D cameras 410A, 410B, 410C, 410D. The exemplary frame linked 2D/3D camera system 400 of FIG. 4 includes eight 2D cameras 470A-H and four 3D cameras 410A-D. A frame linked 2D/3D camera system may include more or fewer 2D and 3D cameras. The frame linked 2D/3D camera system 400 may be used to capture an event 420 which may be, for example, a basketball game as shown in FIG. 4, or some other sporting event, or a cinematic production. The event 420 may be captured, for example, for the purpose of recording the event or for real-time broadcasting of the event. The relative locations of the 2D cameras 470A-H and the 3D cameras 410A-D may be known or determined in advance of capturing the event 420. The locations of portable cameras, if used, may be determined in near real-time using GPS, differential GPS, or some locating technique.

Each of the 2D cameras 470A-H may be coupled to a 2D control unit 484 which may be, for example, a control room located within or external to a venue in which the 2D cameras 470A-H are located. Each of the 2D cameras 470A-H may be coupled to the 2D control unit 484 by a wire or fiber optic cable, such as the cable 486. Some of the 2D cameras, such as the 2D camera 470H, may be coupled to the control unit 484 via a wireless communications link. The 2D camera 470H may be, for example, a portable camera not suitable for connection via a cable or may be too remote from the 2D control unit 484 to run a wired or fiber optic cable.

The 2D control unit 484 may receive a time signal for shutter synchronization via a wire or fiber optic cable, or a wireless communications link. The time signal may be generated by a master time generator 490 that generates SMPTE standard time code. The generation of, distribution of and synchronization to a master time signal is well known in the art and is not relevant to this disclosure beyond the ability of a frame linked 2D/3D camera system to utilize this prior art for shutter synchronization as previously disclosed.

Each of the 3D cameras 410A-D may be coupled to a 3D control unit 444 which may be, for example, a control room located within or external to the venue. Each of the 3D cameras 410A-D may be coupled to the 3D control unit 444 by a wire or fiber optic cable, such as the cable 446. Some of the 3D cameras, such as the 3D camera 41D, may be coupled to the control unit 444 via a wireless communications link. The 3D camera 410D may be, for example, a portable camera not suitable for connection via a cable or may be too remote from the 2D control unit 484 to run a wired or fiber optic cable.

The 3D control unit 444 may be connected to the 2D control unit 484 and/or the individual 2D cameras 470A-H by a communications link 485. The 3D control unit 444 may receive operating parameters of the 2D cameras via the communications link 485. The communications link 485 may be a bus or network, and may include one or more wired, fiber optical, or wireless point-to-point links. The 3D control unit 444 may receive the pan and tilt angles, the lens focus distance, and the lens focal length for some or all of the 2D cameras 470A-H, either from the 2D control unit 484 or directly from the 2D cameras 470A-H. For example, each of the 2D cameras 470A-H may report lens focus distance and lens focal length to the 2D control unit 484, but may not report pan and tilt angles. In this case, the 3D control unit may receive data indicating the lens focus distance and focal length for all 2D cameras 470A-H from the 2D control unit 484, and may receive data indicating pan and tilt angles directly from the individual 2D cameras 470A-H.

The 3D control unit 444 may include a controller 450 that controls the operation of the 3D cameras 410A-D based on, at least in part, the received 2D camera operating parameters. In the example of FIG. 4, a common controller 450 is shown controlling the operation of all 3D cameras 410A-D. However, some or all of the 3D cameras 410A-D may include dedicated controllers that receive data indicating 2D camera operating parameters directly from the 2D control unit 484 or one or more of the 2D cameras 470A-H.

The 3D control unit 444 may receive a time signal for shutter synchronization via a wire or fiber optic cable or a wireless communications link or via the communications link 485. The time signal may be generated by a master time generator 490 that generates SMPTE standard time code. The generation of, distribution of and synchronization to a master time signal is well known in the art and is not relevant to this disclosure beyond the ability of a frame linked 2D/3D camera system to utilize this prior art for shutter synchronization as previously disclosed.

The controller 450 may frame-link one of the 3D cameras 410A-D to one of the 2D cameras. In the example of FIG. 4, the 3D camera 410A is proximate to the 2D camera 470B. Thus, for example, the 3D camera 410A may be frame-linked to the 2D camera 470B. The relationships between the 2D cameras and the 3D cameras may be dynamic. For example, the 3D camera 410A may be selectably frame-linked to 2D camera 470B or 2D camera 470A, depending on the scene content being captured by the 2D cameras.

A 3D camera may be frame-linked to two or more 2D cameras. For example, the 3D camera 410A may be frame-linked to both 2D camera 470A and 2D camera 470B.

Figure 5:
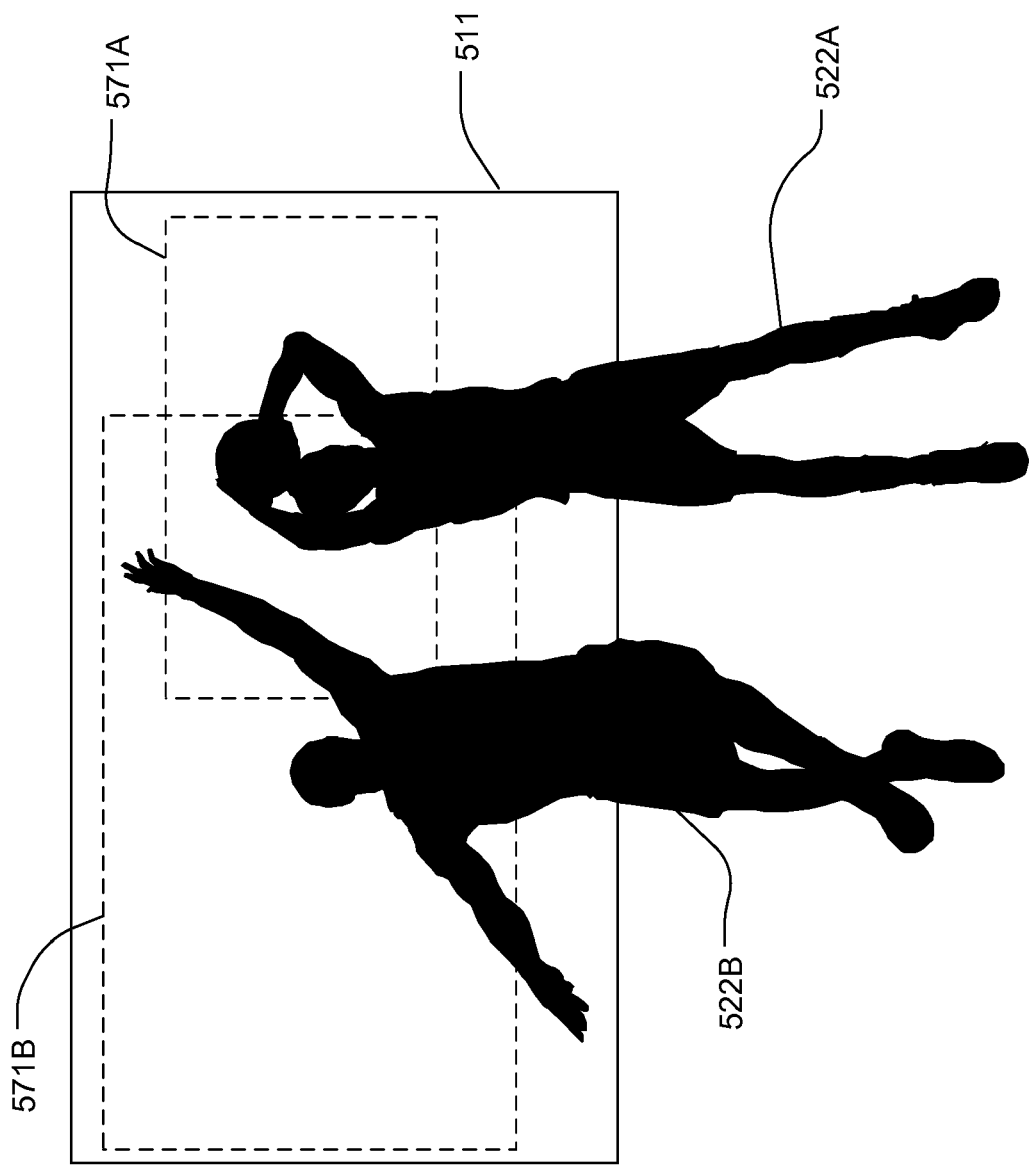
FIG. 5 is a schematic view of image frames of frame-linked 2D and 3D cameras.

Referring to FIG. 5, a first 2D camera (for example, 470A in FIG. 4) may capture a first 2D frame 571A centered on a first primary object (player 522A), and a second 2D camera (for example, 470B in FIG. 4) may capture a second 2D frame 571B centered on a second primary object (player 522B). A 3D camera (for example, 510A in FIG. 4) may capture a 3D frame 511 that encompasses, or includes, both the 2D frames 571A and 571B.

Figure 6:
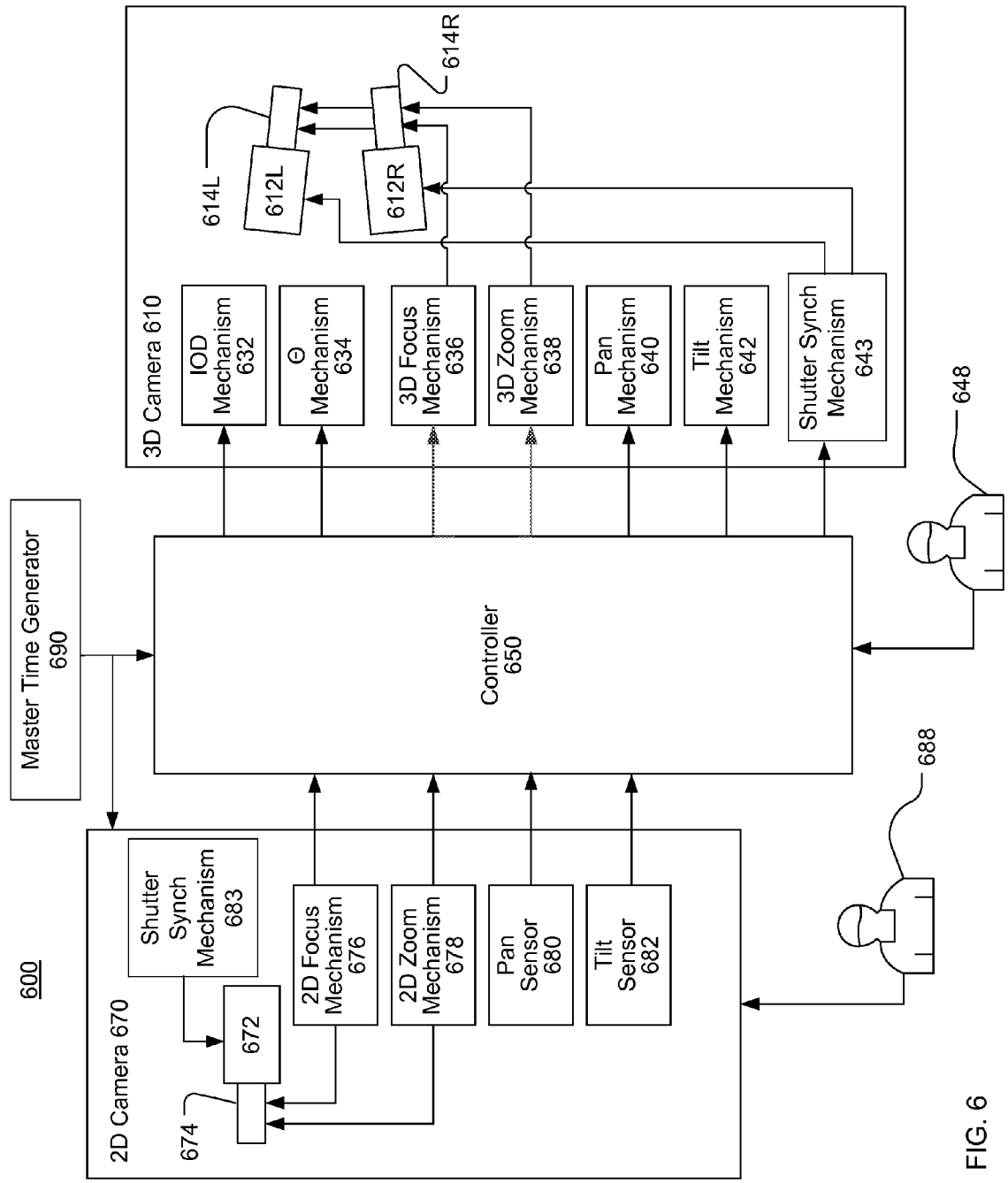
FIG. 6 is a block diagram of a frame-linked 2D/3D camera system.

Referring now to FIG. 6, a frame-linked 2D/3D camera system 600, may include at least one 2D camera 670 and at least one stereographic or 3D camera 610 coupled to a controller 650. As previously described in conjunction with FIG. 4, a frame-linked 2D/3D camera system may include a plurality of 2D and 3D cameras. The 2D camera 670 may include a camera head 672 and a lens 674. The 3D camera 610 may include a left camera 612L and a right camera 612R, each of which has an associated lens 614L, 614R.

The 2D camera 670 may include a focus mechanism 676 and a zoom mechanism 678 for setting a focus distance and a focal length, respectively, of the lens 674. In this disclosure, the term "mechanism" refers to a combination of mechanical, electrical, and electromechanical components, including at least one component movable with respect to other components, and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses.

The 2D camera 670 may include a shutter synchronization mechanism 673 to synchronize the camera shutters with a received time signal.

The 2D camera 670 may receive a time signal for shutter synchronization from a master time generator 690.

The 2D camera 670 may be controlled by one or more operators 688. During cinematic recording, a primary cameraman may control the pan and tilt angles of the camera and the focal length or zoom of the lens 672. An assistant cameraman, who may be called a "focus puller", may control the focus distance of the lens 672. During live video recording, a single cameraman may control the pan and tilt angles, the focal length of the lens 672, and the focus distance of the lens 672. The focus distance of the lens 672 may be controlled by an auto-focus system (not shown) within the 2D camera 670. The one or more cameraman 688 may be located with the 2D camera 670 and may control the 2D camera by physically adjusting the camera pointing angles, the lens focal length, and focus distance. The one or more cameraman 688 may be remote from the 2D camera 670 and may remotely control the 2D camera 670 via data transmitted to the 2D camera over a communications link.

The one or more cameraman 688 may control the 2D focus mechanism 676 and the 2D zoom mechanism 678 to set the focus distance and focal length of the lens 674. The 2D focus mechanism 676 and the 2D zoom mechanism 678 may include respective sensors to send data indicating the 2D focus distance and 2D focal length, respectively, to the controller 650. The 2D camera 670 may also include a pan sensor 680 and a tilt sensor 682 to send data indicating the 2D pan angle and 2D tilt angle respectively, to the controller 650. Each of the sensors may be a potentiometer, an encoder, a transducer, or some other sensor.

The 3D camera 610 may include a plurality of mechanisms to adjust the position and/or orientation of the left and right cameras 612L, 612R. The 3D camera 610 may also include a focus mechanism 636 and a zoom mechanism 638 to synchronously adjust a focus distance and a focal length, respectively, of the left and right lenses 614L, 614R.

The 3D camera 610 may include an IOD mechanism 632 to adjust an interocular distance between the left camera 612L and the right camera 612R. The 3D camera 610 may include a Θ mechanism 634 to adjust a stereo convergence angle between the left camera 612L and the right camera 612R by pivoting one or both cameras about respective pivot axes. The IOD mechanism 632, and the Θ mechanism 634 may include one or more movable platforms or stages coupled to motors or other actuators. The IOD mechanism 632 and the Θ mechanism 634 may be adapted to set the interocular distance and the stereo convergence angle, respectively, in response to data received from the controller 650. Within this patent, the term "data" is intended to include digital data, commands, instructions, digital signals, analog signals, optical signals and any other data that may be used to communicate the value of a parameter such as interocular distance or convergence angle.

The 3D camera 610 may include a shutter synchronization mechanism 643 to synchronize the camera shutters with a time signal received from the controller 650.

The focus mechanism 636 may synchronously adjust and set the focus distance of the lenses 614L, 614R. The focus mechanism 636 may include a mechanical, electronic, electrical, or electro-mechanical linkage between the lenses 614L, 614R to simultaneously adjust the focus distance of both lenses to the same value. The focus mechanism 636 may include a motor or other actuator adapted to set the focus distance in response to data received from the controller 650.

The zoom mechanism 638 may synchronously adjust and set the focal length of the lenses 614L, 614R. The zoom mechanism 638 may include a mechanical, electronic, electrical, or electro-mechanical linkage between the lenses 614L, 614R to simultaneously adjust the focal length of both lenses to the same value. The zoom mechanism 638 may include a motor or other actuator adapted to set the focal length in response to data received from the controller 650.

The 3D camera 610 may include a pan mechanism 640 and a tilt mechanism 642 to adjust and set the pan (azimuth) and tilt (elevation) pointing angles of the left and right cameras 612L, 612R. The pan mechanism 640 and the tilt mechanism 642 may each include a motor or other actuator adapted to set the pan and tilt angles, respectively, in response to data received from the controller 650.

The controller 650 may receive data from the 2D camera 670 indicating the operating parameters of the 2D camera including pan and tilt angles, focal length, and focus distance. The controller 650 may also receive a time signal for shutter synchronization from a master time generator 690. The controller 650 may also receive data from a 3D camera operator 648 indicating a required vertical offset, a required horizontal offset and size of the 3D image frame relative to the 2D image frame. For example, the controller 650 may receive data indicating a vertical offset distance, a horizontal offset distance, tilt angle difference or pan angle difference, and a proportionality constant relating the sizes of the 3D and 2D image frames. The 3D camera operator 648 may be located remote from the 3D camera 610 and/or the controller 650. The controller 650 may determine required operating parameters for the 3D camera from the operating parameters of the 2D camera and the data received from the 3D camera operator. For example, the controller 650 may apply formulas (3)-(8) and (11)-(15) to determine the required 3D camera operating parameters. Alternatively, the controller 650 may automatically determine one or all of the vertical offset, horizontal offset and size of the 3D image frame relative to the 2D image frame based on the 2D camera lens focus distance and lens focal length. The controller 650 may send data indicating a required tilt angle, pan angle, focal length, and focus distance to the 3D camera 610.

The controller 650 may also receive data from the 3D camera operator 648 indicating a desired interocular distance between the cameras 612L, 612R. Alternatively, the controller may calculate a desired interocular distance based on the 3D camera operating parameters and scene characteristics as described in copending patent application Ser. No. 12/578,488, entitled Stereo Camera With Automatic Control of Interocular Distance, the entire disclosure of which is incorporated herein by reference. In either case, the controller 650 may determine a required convergence angle Θ and send data indicating the interocular distance and convergence angle Θ to the 3D camera 610.

Figure 7:
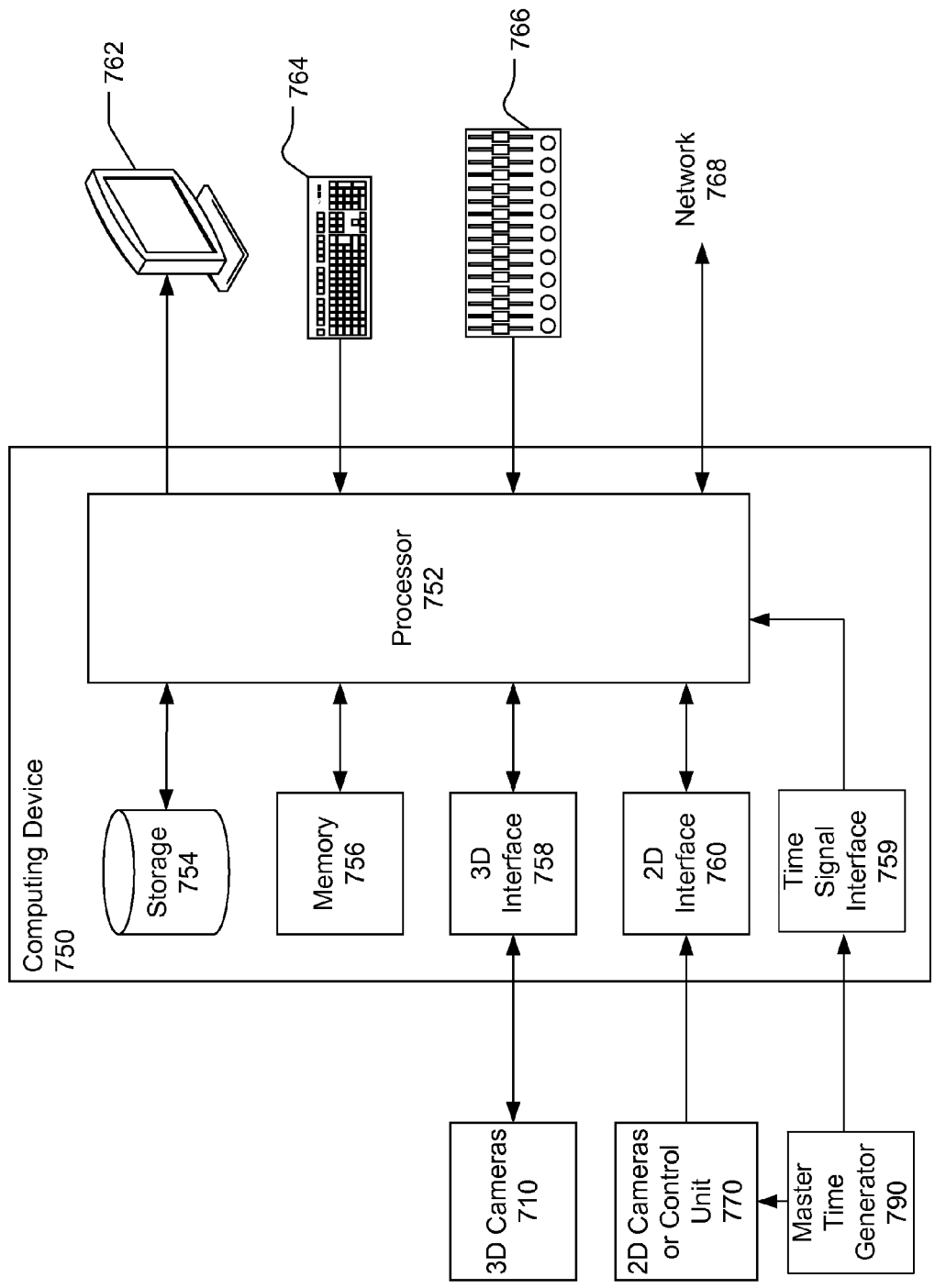
FIG. 7 is a block diagram of a computing device.

FIG. 7 is a block diagram of a computing device 750 that may be suitable for the controller 650. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 750 may include hardware, firmware, and/or software resident on hardware and/or firmware adapted to perform the processes subsequently described herein. The computing device 750 may include a processor 752 coupled to a memory 756 and a storage device 754.

The storage device 754 may store instructions which, when executed by the computing device 750, cause the computing device to provide the features and functionality of the controller 650. As used herein, a storage device is a device that allows for reading from and/or writing to a storage medium Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 750 may include or interface with a display device 762 and one or more input devices such as a keyboard 764. The computing device 750 may include or interface with an camera operator interface 766, by which a camera operator may control, at least in part, the operation of one or more cameras. For example, the camera operator interface may be adapted to allow a camera operator to enter 3D camera operating parameters including some or all of a vertical frame offset, a horizontal frame offset, a tilt angle difference, a frame size proportionality constant, and/or an interocular distance.

The computing device 750 may also include an interface with one or more networks 768. The computing device 750 may interface with the network 768 via a wired or wireless connection. The network 768 may be the Internet or any other private or public network.

The computing device 750 may also include a 3D camera interface unit 758 to interface with a 3D camera 710 and a 2D camera interface 760 unit to interface with a 2D camera or 2D camera control unit 770. The 2D and 3D camera interface units 758, 760 may include a combination of circuits, firmware, and software to interface with the 3D camera 710 and the 2D camera/control unit 770. The camera interface units 758, 760 may be coupled to the respective cameras via a network which may be a local area network; via one or more buses such as a USB bus, a PCI bus, a PCI Express bus, or other parallel or serial data bus; or via one or more direct wired or wireless connections. The camera interface units 758, 760 may be coupled to the respective cameras via a combination of one or more of direct connections, network connections, and bus connections.

The computing device 750 may also include a time signal interface 759 by which a time signal from a master time generator 790 may be received and passed to the processor 752. The time signal interface 759 may be via a wired or wireless connection.

The processes, functionality and features of the computing device 750 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 750 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 752 and others by other devices.

Description of Processes

Figure 8:
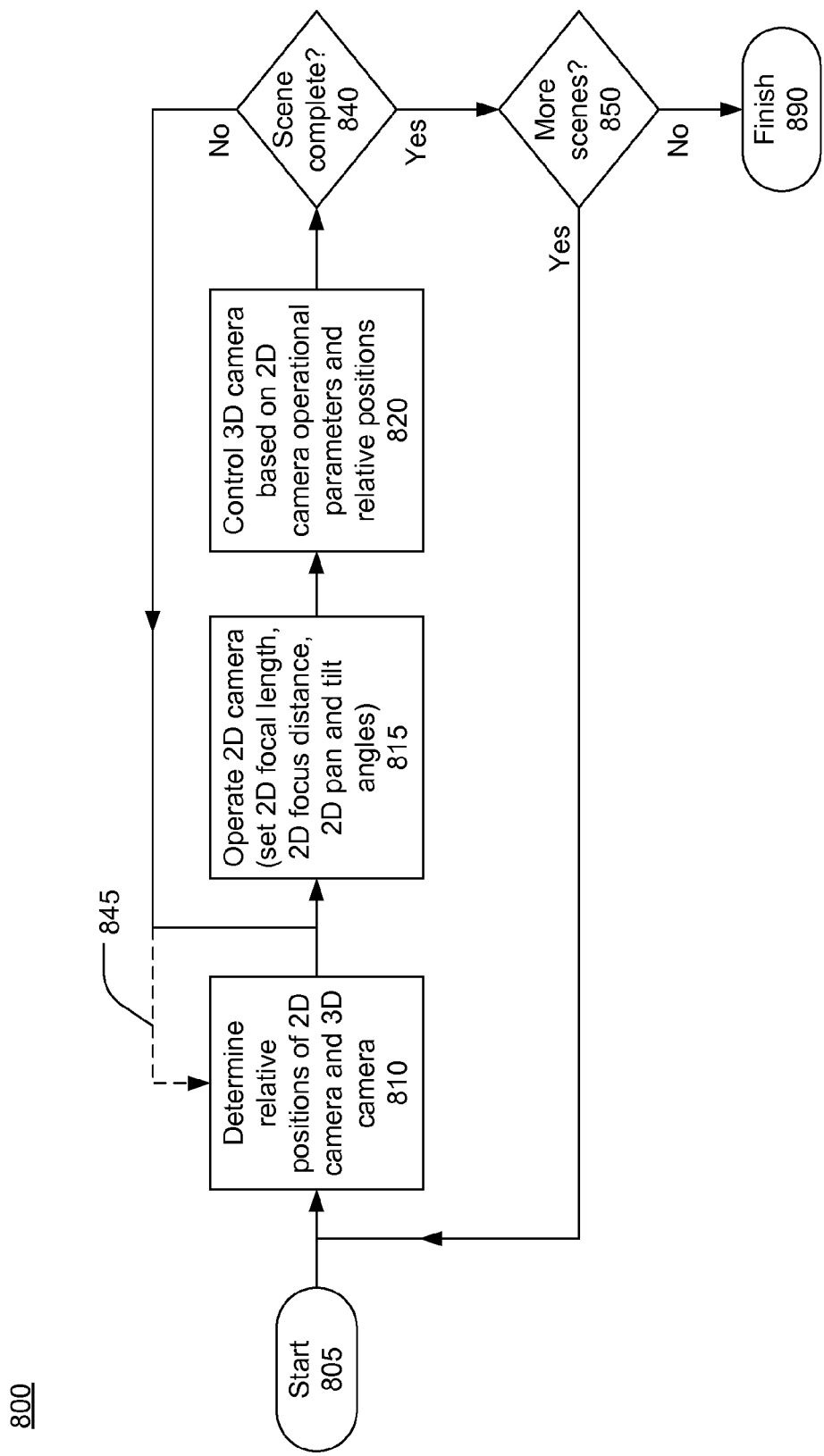
FIG. 8 is a flow chart of a process for operating a frame-linked 2D/3D camera system.

FIG. 8 is a flow chart of an exemplary process 800 for simultaneously recording 2D and 3D images using a frame-linked 2D/3D camera system such as the frame-linked 2D/3D camera system 200. Specifically, FIG. 8 is a flow chart of an exemplary process 800 for simultaneously recording 2D and 3D images using an operator-controlled 2D camera and a 3D camera that is controlled, at least in part, automatically in response to the operation of the 2D camera. The exemplary process 800 involves a single 2D camera and a single 3D camera but may be easily adapted for systems with multiple 2D and/or 3D cameras, such as the frame-linked 2D/3D camera system 400.

The flow chart of FIG. 8 has a start 805 and a finish at 890 when the recording of one or more scenes is complete. The process 800 is cyclic in nature, and the actions 810-845 may be repeated for each of a large plurality of scenes that may constitute, for example, a motion picture or television program. The process 800 is continuous in nature and the actions 815-840 within the process may be performed continuously and in near-real time during the recording of each scene. Within this disclosure, the phrase "near-real time" means in real time except for processing delays that are very short compared with temporal events in the scene being recorded.

At 810, the relative positions of the 2D camera and the 3D camera may be determined. For example the position of the 2D camera may be defined as the origin of a rectangular coordinate system and the position of the 3D camera may be defined by $X_O$, $Y_O$, and $Z_O$ coordinates as shown, in part, in FIG. 2. The relative positions of the 2D camera and the 3D camera may be defined using some other coordinate system. The relative positions of the 2D camera and the 3D camera may be determined prior to recording an event or a scene, and may be fixed for the duration of the event. One or both of the 2D camera and the 3D camera may be portable or movable during the event, in which case the relative positions may be determined in near real time.

The relative positions of the 2D camera and the 3D camera may be determined at 810 by direct measurement, by GPS receivers located at each camera, or by reference to information such as architectural drawings of the venue where the cameras are located. The relative positions of the 2D and 3D cameras may be determined by triangulation (pointing each camera sequentially to a plurality of selected targets within their environment and calculating the camera positions from the pan and tilt angles). The relative positions of the 2D and 3D cameras may be determined by some other method, or by a combination of methods.

At 815, one or more camera operators may operate the 2D camera to capture a portion of the scene or event. The one or more camera operators may operate the 2D camera in response to commands from a director. The one or more camera operators may operate the 2D camera at 815 by setting a pan angle, a tilt angle, a lens focal length, and a lens focus distance for the 2D camera. The pan angle, the tilt angle, the lens focal length, and the lens focus distance may be fixed for the duration of the scene. One or all of the pan angle, the tilt angle, the lens focal length, and the lens focus distance may be varied in real-time during the capture of a scene or event.

At 820, the 3D camera may be operated, automatically at least in part, based on the relative positions determined at 810, the 2D camera operating parameters set at 815, and, in some cases, parameters set by a 3D camera operator including a pan angle, a tilt angle, a lens focus distance, and a lens focal length from the relative positions determined at 810, the 2D camera operating parameters set at 815, and, when provided, inputs from a 3D camera operator. For example, at 820 formulas (3)-(8) and (11)-(15) may be applied to automatically determine the required 3D camera operating parameters including a pan angle, a tilt angle, a lens focus distance, and a lens focal length from the relative positions determined at 810, the 2D camera operating parameters set at 815, and, when provided, inputs from a 3D camera operator.

At 840, a determination may be made if the recording of the scene or event has been completed. When the scene or event has not been completed, the process 800 may repeat from 815. In the situation where one or both of the 2D camera and the 3D camera are portable, the process 800 may repeat from 810, as indicated by the dashed line 845. The actions from 810 or 815 to 840 may be performed continuously and essentially simultaneously until the scene or event is completed. When the scene or event has been completed, the process may continue to 850, where a determination may be made if more scenes will be recorded. The process 800 may repeat from 810 for each subsequent scene. The process 800 may finish at 890 when all scenes or the entire event have been completed.

Figure 9:
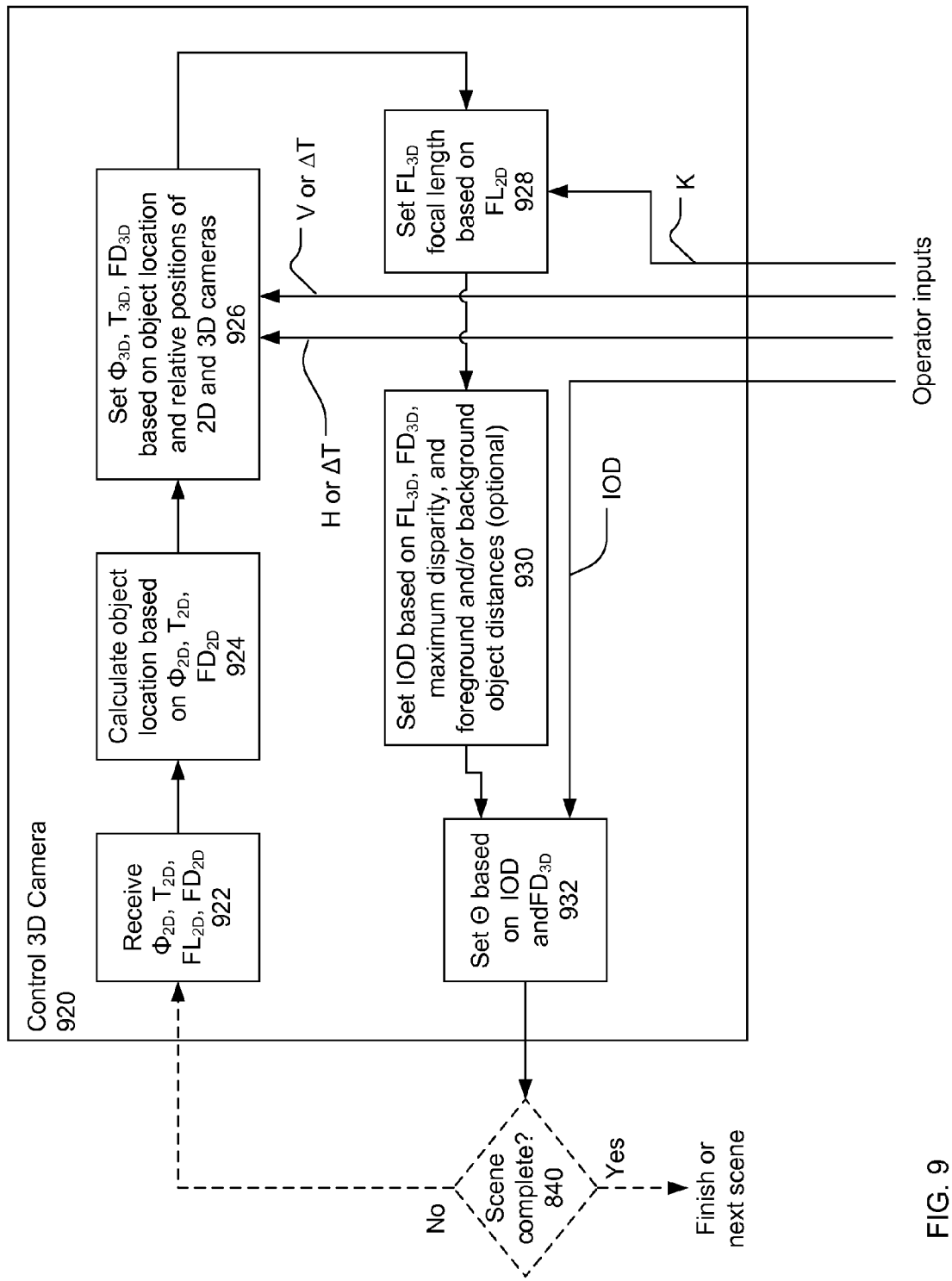
FIG. 9 is a flow chart of a process for operating a frame-linked 2D/3D camera system.

FIG. 9 is a flow chart of a process 920 for controlling a 3D camera, which may be suitable for use at 820 in the process 800 of FIG. 8.

At 922 data defining operating parameters of a 2D camera may be received, including a pan angle $\Phi_{2D}$, a tilt angle $T_{2D}$, a lens focal length $FL_{2D}$, and a lens focus distance $FD_{2D}$. The operating parameters of the 2D camera may be received by a 3D camera or an associated 3D control unit from the 2D camera or an associated 2D control unit. The operating parameters of the 2D camera may be received via one or more communication links.

At 924, the location of a primary object at the center of the image frame of the 2D camera may be calculated based on $\Phi_{2D}$, $T_{2D}$, and $FD_{2D}$ received at 922. For example, formulas (3), (4), and (5) may be used to define the location of the primary object in a rectangular coordinate system.

At 926, a pan angle $\Phi_{3D}$, a tilt angle $T_{3D}$, and a lens focus distance $FD_{3D}$ for the 3D camera may be determined and set based on the primary object location determined as 924 and predetermined relative locations of the 2D and 3D cameras. For example, equations (6), (14) or (15) and (8) may be applied to determine $\Phi_{3D}$ and $FD_{3D}$, respectively, and equation (7), (12), or (13) may be applied to determine $T_{3D}$. $T_{3D}$ may be determined, in part, by a vertical offset V which may be predetermined and fixed for a scene or event, or which may be input from an operator. $\Phi_{3D}$ may be determined, in part, by a horizontal offset H which may be predetermined and fixed for a scene or event, or which may be input from an operator.

At 928, a lens focal length $FL_{3D}$ for the 3D camera may be determined and set based on the 2D camera operating parameters received at 922 and the predetermined relative locations of the 2D and 3D cameras. For example, equation (11) may be applied to determine $FL_{3D}$. $FL_{3D}$ may be determined, in part, by a proportionality constant K which may be predetermined and fixed for a scene or event, or which may be input from an operator.

At 930, the interocular distance IOD of the 3D camera may be automatically determined and set based on the operating parameters of the 3D camera and known characteristics of the scene including a distance to the nearest foreground object and/or a distance to a furthest background object. For example, the IOD of the 3D camera may be determined and set as described in copending patent Application Ser. No. 12/578,488. Alternatively, the IOD may be fixed for a scene or event or may be input by an operator.

At 932, a convergence angle $\Theta_{3D}$ of the 3D camera may be determined and set based on the lens focus distance $FD_{3D}$ and the IOD, either from 930 or from an operator input. For example, equation (1) may be applied to determine the IOD.

When the process 920 is incorporated into a process such as the process 800, the actions from 922-932 may be performed continuously in near real time until a determination is made (for example at 850 in the process 800) that the recording of the scene or event has been completed.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

Within this description, the terms "unit" and "engine" mean a collection of hardware which may be augmented by firmware, and/or software. A "unit" may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of operating a 3D camera to capture an image of a scene, comprising:
   receiving data conveying operating parameters of at least one 2D camera;
   setting operating parameters of the 3D camera including a pan angle $\Phi_{3D}$, a tilt angle $T_{3D}$, a lens focal length $FL_{3D}$, and a lens focus distance $FD_{3D}$ based on, at least in part, the received data;
   setting an interocular distance IOD of the 3D camera; and
   setting a stereo convergence angle $\Theta$ of the 3D camera based on IOD and $FD_{3D}$.

2. The method of operating a 3D camera of claim 1, wherein the received data conveys operating parameters of the 2D camera including one or more of a pan angle $\Phi_{2D}$, a tilt angle $T_{2D}$, a lens focal length $FL_{2D}$, and a lens focus distance $FD_{2D}$.

3. The method of operating a 3D camera of claim 1, wherein setting operating parameters of the 3D camera further comprises setting the lens focal length $FL_{3D}$ based on, in part, a proportionality parameter K.

4. The method of operating a 3D camera of claim 3, wherein K defines a relative size of a 3D image frame to a 2D image frame.

5. The method of operating a 3D camera of claim 4, wherein K is predetermined.

6. The method of operating a 3D camera of claim 4, wherein K is variable and input by an operator.

7. The method of operating a 3D camera of claim 1, wherein setting operating parameters of the 3D camera further comprises setting the tilt angle $T_{3D}$ based on, in part, a vertical offset parameter V.

8. The method of operating a 3D camera of claim 7, wherein V defines a vertical distance from the center of the 3D image frame to a center of the 2D image frame.

9. The method of operating a 3D camera of claim 8, wherein V is predetermined.

10. The method of operating a 3D camera of claim 8, wherein V is variable and input by an operator.

11. The method of operating a 3D camera of claim 1, wherein setting operating parameters of the 3D camera further comprises setting the pan angle $\Phi_{3D}$ based on, in part, a horizontal offset parameter H.

12. The method of operating a 3D camera of claim 11, wherein H defines a horizontal distance from the center of the 3D image frame to a center of the 2D image frame.

13. The method of operating a 3D camera of claim 12, wherein H is predetermined.

14. The method of operating a 3D camera of claim 12, wherein H is variable and input by an operator.

15. The method of operating a 3D camera of claim 1, further comprising:
   determining a relative location of the 3D camera with respect to the 2D camera; and
   setting the operating parameters based of the 3D camera based on, in part, the relation location of the 3D camera with respect to the 2D camera.

16. The method of operating a 3D camera of claim 1, wherein setting IOD further comprises:
   setting IOD to one of a predetermined value and a value input by an operator.

17. The method of operating a 3D camera of claim 1, wherein setting IOD further comprises:
   setting IOD automatically based on the operating parameters of the 2D camera and predetermined characteristics of the scene.

18. The method of operating a 3D camera of claim 17, wherein the predetermined characteristics of the scene include one or both of a distance from the 3D camera to the nearest foreground object and a distance from the 3D camera to a furthest background object.

19. The method of operating a 3D camera of claim 1, wherein
   the at least one 2D camera is two 2D cameras each having a respective image frame, and
   setting operating parameters of the 3D camera further comprises setting the lens focal length $FL_{3D}$ to cause a 3D image frame to encompass 2D image frames of both 2D cameras.

20. A frame-linked 2D/3D camera system, comprising:
   at least one 2D camera;
   a 3D camera comprising:
      a left camera and a right camera including respective left and right lenses, and
      plural mechanisms to set a pan angle $\Phi_{3D}$, a tilt angle $T_{3D}$, an interocular distance IOD and a stereo convergence angle $\Theta$ of the 3D camera and to set a focal length $FL_{3D}$ and a focus distance $FD_{3D}$ of the left and right lenses; and
   a controller coupled to the at least one 2D camera and to the plural mechanisms of the 3D camera, the controller configured to:
      receive data indicating operating parameters of the at least one 2D camera,
      set operating parameters of the 3D camera including the pan angle $\Phi_{3D}$, the tilt angle $T_{3D}$, the lens focal length $FL_{3D}$, and the lens focus distance $FD_{3D}$ based on, at least in part, the received data,
      set the interocular distance IOD of the 3D camera, and
      set a stereo convergence angle $\Theta$ of the 3D camera based on IOD and $FD_{3D}$.

21. The frame-linked 2D/3D camera system of claim 20, wherein the received data conveys operating parameters of the 2D camera including one or more of a pan angle $\Phi_{2D}$, a tilt angle $T_{2D}$, a lens focal length $FL_{2D}$, and a lens focus distance $FD_{2D}$.

22. The frame-linked 2D/3D camera system of claim 20, wherein the controller is configured to set $FL_{3D}$ based on, in part, a proportionality parameter K.

23. The frame-linked 2D/3D camera system of claim 22, wherein K defines a relative size of a 3D image frame to a 2D image frame.

24. The frame-linked 2D/3D camera system of claim 23, wherein K is predetermined.

25. The frame-linked 2D/3D camera system of claim 23, wherein K is variable and input by an operator.

26. The frame-linked 2D/3D camera system of claim 20, wherein the controller is configured to set $T_{3D}$ based on, in part, a vertical offset parameter V.

27. The frame-linked 2D/3D camera system of claim 26, wherein V defines a vertical distance from the center of the 3D image frame to a center of the 2D image frame.

28. The frame-linked 2D/3D camera system of claim 27, wherein V is predetermined.

29. The frame-linked 2D/3D camera system of claim 27, wherein V is variable and input by an operator.

30. The frame-linked 2D/3D camera system of claim 20, wherein the controller is configured to set $\Phi_{3D}$ based on, in part, a horizontal offset parameter H.

31. The frame-linked 2D/3D camera system of claim 30, wherein H defines a horizontal distance from the center of the 3D image frame to a center of the 2D image frame.

32. The frame-linked 2D/3D camera system of claim 31, wherein H is predetermined.

33. The frame-linked 2D/3D camera system of claim 31, wherein H is variable and input by an operator.

34. The frame-linked 2D/3D camera system of claim 20, wherein the controller is further configured to set the operating parameters of the 3D camera based on, in part, a predetermined relative location of the 3D camera with respect to the 2D camera.

35. The frame-linked 2D/3D camera system of claim 20, wherein the controller is configured to set IOD to one of a predetermined value and a value input by an operator.

36. The frame-linked 2D/3D camera system of claim 20, wherein the controller is configured to set IOD automatically based on the operating parameters of the 2D camera and predetermined characteristics of the scene.

37. The frame-linked 2D/3D camera system of claim 36, wherein the predetermined characteristics of the scene include one or both of a distance from the 3D camera to the nearest foreground object and a distance from the 3D camera to a furthest background object.

38. The frame-linked 2D/3D camera system of claim 20, wherein the at least one 2D camera is two 2D cameras each having a respective image frame, and the controller is configured to set the lens focal length $FL_{3D}$ to cause a 3D image frame to encompass 2D image frames of both 2D cameras.

39. A computing device, comprising:
a processor;
memory coupled to the processor;
a 2D camera interface for connection to at least one 2D camera;
a 3D camera interface for connection to a 3D camera; and
a storage device coupled to the processor, the storage device storing instructions which, when executed by the processor, cause the computing device to perform actions including:
receiving, via the 2D camera interface, data conveying operating parameters of the at least one 2D camera,
sending, via the 3D camera interface, data to set operating parameters of the 3D camera including a pan angle $\Phi_{3D}$, a tilt angle $T_{3D}$, a lens focal length $FL_{3D}$, and a lens focus distance $FD_{3D}$ based on, at least in part, the received data,
sending, via the 3D camera interface, data to set an interocular distance IOD of the 3D camera, and
sending, via the 3D camera interface, data to set a stereo convergence angle $\Theta$ of the 3D camera based on IOD and $FD_{3D}$.

* * * * *